(12) United States Patent
Farrokhi et al.

(10) Patent No.: US 9,977,131 B2
(45) Date of Patent: May 22, 2018

(54) FAST FIX USING PERFECT REFERENCE IN A SATELLITE-BASED POSITIONING SYSTEM

(71) Applicant: Etherwhere Corporation, Sunnyvale, CA (US)

(72) Inventors: Farrokh Farrokhi, San Ramon, CA (US); Edmund Gregory Lee, Palo Alto, CA (US); Dickson Wong, Burlingame, CA (US)

(73) Assignee: ETHERWHERE CORPORATION, Sunnyvale, CA (US)

( * ) Notice: Subject to any disclaimer, the term of this patent is extended or adjusted under 35 U.S.C. 154(b) by 0 days. days.

(21) Appl. No.: 14/053,225

(22) Filed: Oct. 14, 2013

(65) Prior Publication Data

US 2015/0204982 A1    Jul. 23, 2015

(51) Int. Cl.
*G01S 19/36* (2010.01)
*G01S 19/24* (2010.01)

(52) U.S. Cl.
CPC .................... *G01S 19/246* (2013.01)

(58) Field of Classification Search
CPC ........ G01S 19/36; G01S 19/246; G01S 19/37; G01S 19/35; H01Q 21/06; H01Q 21/24; H04B 7/10; H04B 7/00
USPC .......................... 342/357.76, 357.75, 357.77
See application file for complete search history.

(56) References Cited

U.S. PATENT DOCUMENTS

| | | | |
|---|---|---|---|
| 6,407,699 B1 * | 6/2002 | Yang | G01S 19/21 342/357.59 |
| 2006/0082496 A1 * | 4/2006 | Winternitz | G01S 19/14 342/357.63 |
| 2008/0180321 A1 * | 7/2008 | Wang | G01S 19/235 342/357.62 |
| 2008/0232611 A1 * | 9/2008 | Filipovic | H04B 15/06 381/94.3 |
| 2010/0074369 A1 * | 3/2010 | Seki | H04J 11/0076 375/302 |
| 2014/0266880 A1 | 9/2014 | Farrokhi | |

* cited by examiner

*Primary Examiner* — Harry K Liu
(74) *Attorney, Agent, or Firm* — Haynes and Boone, LLP

(57) ABSTRACT

A satellite-based positioning system (SPS) signal processing technique re-samples a received series of PRN sequences from an SPS satellite to align them with a nominal sampling rate for a corresponding series of perfect reference PRN replica sequences.

11 Claims, 11 Drawing Sheets

FAST FIX USING PERFECT REFERENCE IN A SATELLITE-BASED POSITIONING SYSTEM

BACKGROUND OF THE INVENTION

In a satellite-based positioning (SPS) system, each satellite has a unique code that it transmits. For example, a GPS satellite continuously transmits a unique pseudorandom sequence of bits known as a C/A code every millisecond. A GPS receiver has a copy of the appropriate C/A code and can thus correlate its C/A code copy with the received satellite signal. Since the C/A code is used for positioning instead of data transfer, it is conventional to refer to its bits as "chips." In a GPS system, a satellite transmits 1023 chips every millisecond. The GPS receiver correlates the received chips with its C/A code copy. Note that there is a constellation of GPS satellites so it would be very inefficient to correlate for each satellite since only a subset of the constellation will be visible at any given time. The GPS receiver uses almanac data to identify the satellites from which it should be receiving chips. In this fashion, a GPS receiver upon cold start does not need to correlate for each satellite but only for the likely candidates.

To obtain a position fix, a conventional SPS receiver such as a GPS receiver correlates its copy of the C/A code for the satellite it is searching for with the received signal. Since the noise is incoherent to the sequence of chips, this correlation has the advantageous property that the noise is decorrelated whereas the satellite signal is correlated. In this fashion, satellite signals are "pulled" out of the noise despite the satellites being thousands of miles away and having relatively weak transmitters. In a GPS system, the correlation will have a sharp peak every 1023 chips since the satellite's C/A code sequence is 1023 chips in length. The GPS receiver can thus identify the time of receipt for a C/A code sequence based upon the chip in which the correlation peaks. But an SPS receiver must also know when the satellite transmitted its code sequence to the SPS receiver.

An SPS satellite thus periodically transmits its time. For example, a GPS satellite transmits its time-of-week (TOW) every six seconds following a sub-frame preamble. In addition, the GPS satellite transmits its ephemeris or position in space. The TOW, ephemeris, and other data transmitted by the satellite are designated as "navigation data." This navigation data is transmitted using a modulation overlay of navigation bits ("nav bits") on the C/A code sequences. In particular, a group of C/A code sequences forms one nav bit.

To get the TOW, a GPS receiver must thus identify the sub-frame preamble. The preamble comprises eight nav bits. Once the sub-frame preamble is identified and the corresponding TOW decoded, a GPS receiver knows the transmission time for any C/A sequence in the sub-frame since each C/A code sequence is 1 millisecond in length. For example, if a GPS receiver correlates a C/A code sequence that is the 30$^{th}$ sequence after the preamble, the GPS receiver can determine that this code sequence's transmission time equals the TOW plus 30 milliseconds. But note that noise may have corrupted the nav bits such that the GPS receiver misidentifies the preamble. It is thus conventional for a GPS receiver to continue receiving and correlating the C/A sequences until it identifies the subsequent preamble. At that point, the probability of falsely identifying the sub-frame preamble is insignificant such that the receiver may proceed to obtain a position fix. Although this processing is conventional and well-understood, it requires the GPS receiver to be powered for at least six seconds until it receives the subsequent preamble and may proceed to obtain a first position fix. This six-second minimum time-to-first-fix is not an issue in, for example, automotive navigation applications in which there is abundant power available. But power consumption is very much an issue in mobile devices such as cellular telephones.

The reception of all the required navigation data upon a cold start for a GPS receiver can take up to 15 minutes. But the use of GPS technology in mobile devices such as cellular telephones has lead to the development of an assistance technique that is designated various ways in the industry such as by the term "extended ephemeris." In extended ephemeris, a GPS receiver receives the navigation data through a second channel instead of needing to rely on the satellite's transmission of the navigation data. Through the use of extended ephemeris, a handset can immediately know which satellites are visible and what their ephemeris is. Extended ephemeris thus markedly reduces the time necessary to receive the navigation data. But even with extended ephemeris, the GPS receiver must still determine the satellite transmission time, which conventional requires six seconds as discussed above.

The navigation data may be better understood with reference to FIG. 1a, which illustrates how a navigational bit is a phase overlay on twenty consecutive C/A codes. At the navigation bit boundary, the phase overlay either flips (going from +1 to −1 or from −1 to +1) or stays the same. As will be discussed further herein, such a phase transition is problematic with regard to coherently integrating or summing the cross-correlations for a series of PRN sequences that extends over the navigation bit boundaries. As used herein a "PRN sequence" denotes the pseudorandom code transmitted by a navigation system satellite. For example, the PRN sequence for a GPS satellite comprises the 1024 chips for its C/A code. A sequence of PRN sequences that extends over the navigation bit boundaries thus comprise more than 20 C/A code sequences in a GPS embodiment. Coherently integrating across the navigation bit boundary must thus account for the navigation bit overlay. For example, if one navigation bit is +1 and the subsequent navigation bit is −1, the coherent integration of the cross-correlations for the PRN sequences for the first navigation bit is opposed by the coherent integration over the PEN sequences for a subsequent navigation bit. Regardless of the phase transition at each navigation bit boundary, the GPS navigation message is used in combination with the acquired pseudo ranging information from the C/A codes to complete the navigation equations to determine the location coordinates of the GPS receiver. The navigation bits themselves are divided into 25 frames, each having a length of 1500 bits (thus requiring an interval of 30 seconds for transmission in a GPS embodiment). FIG. 1b illustrates a frame of the complete signal. As shown in this figure, the HOW word repeats every six seconds at the start of a sub-frame subsequent to the TLM word. The HOW word includes the TOW discussed above.

To obtain a "pseudorange" to a given satellite, a GPS receiver correlates a copy of a satellite's unique pseudorandom (PRN) C/A sequence with the received PRN sequence. The copy is correlated with regard to each chip position. In other words, prior to acquiring the satellite signal, an SPS receiver does not know which chip position corresponds to the arrival time for the received PRN sequence. The pseudorandom nature of PRN sequence is quite advantageous in that received noise is effectively decorrelated by such a code. But if the copy of the PRN sequence is properly aligned with the received PRN sequence in a cross-correlation, all the chips coherently add together. This correlation peak occurs for one of the 1023 possible chip alignments of the received PRN sequence with the replica PRN sequence. The received PRN sequence is then located in time—its arrival time is known. But an SPS receiver must also search in frequency as well due to Doppler shift and local oscillator (LO) uncertainties. Once the received PRN sequence is located in time and frequency, the SPS receiver can obtain a "pseudorange" between it and the transmitting satellite. This pseudorange is based upon the time the satellite transmitted the PRN sequence and the time of reception by the SPS receiver. Based upon this elapsed time and the fact that the satellite transmission occurred at the speed of light, the SPS receiver can calculate the range between it and the transmitting satellite. But note that the satellite has a very accurate atomic clock. So there is relatively little uncertainty to the reported transmission time by the satellite. In contrast, the SPS receiver will typically have a relatively inexpensive clock, which is substantially less accurate than the satellite clock. The SPS receiver clock thus has an unknown offset to the satellite clock. For this reason, the time the SPS receiver believes it received the PRN sequence is not the 'true" time that it would have calculated if it had a more accurate clock that was synchronized to the expensive satellite clock. This unknown clock offset adds uncertainty to the range measurement, hence it is denoted as a pseudorange.

Referring now to FIG. 2a, an SPS receiver knows the transmitting satellite's position in space from the associated ephemeris (whether that ephemeris was taken from the nav bits or was received in an extended ephemeris scheme). For example, the position of a satellite A 11 and a satellite B 12 is known. A pseudorange A 13 from satellite A forms a sphere about the satellite's position. If the SPS receiver were not earth-bound, it could be anywhere on the sphere. But if we assume that the SPS receiver is on the earth's surface, the pseudorange defined sphere intersects the earth's surface in a circular fashion as shown in FIG. 2a. A similar pseudorange-defined sphere about satellite B with regard to its pseudorange 14 produces another circular intersection. Since the SPS receiver is on the earth's surface (or if we assume so), it will then be located at the resulting intersection points 15 and 16, resulting in an ambiguous location. An SPS receiver thus needs more than just a pair of pseudoranges to get a position fix.

The clock offset uncertainty that affects location determination may be better understood with reference to FIG. 2b, which illustrates the result of the two acquired satellites SAT A 11 and SAT B 12 when the clock in SPS receiver 10 is 2 milliseconds late as compared to the clock of the SPS satellites. This causes the travel-time of the transmitted signals to appear to be 2 milliseconds longer than it actually is. The dotted ovals represent the actual range, Range_A 13 and Range_B 14, plus the range from the 2 ms clock offset. As the transmitted signals travel at the speed of light, even a small clock offset translates into large inaccuracies. Since atomic clocks are not a practical solution for SPS receivers, the problem is solved using an additional pseudorange.

FIG. 2c illustrate the intersections of a third pseudorange 22 with respect to a satellite C 21 with the pseudoranges from FIG. 2b. The pseudoranges all have the same clock offset because they are based they are based upon the same reception times in one SPS receiver. The three intersection points resulting from the three pseudoranges intersect at point 19, point 23 and point 24. From the intersection points, the clock offset is calculated by adjusting the clock offset until the three intersection points merge to a single point. Once this is completed, the clock of the SPS receiver has been synchronized with the atomic clock of the SPS satellite system. This is a 2-dimensional location as this point represents the intersection of the adjusted pseudoranges on the surface of the Earth. Additionally, acquiring a fourth concurrent satellite, resulting in a fourth concurrent pseudorange, will allow for a 3-dimensional location coordinate to be determined. Our attention now will switch to the process by which pseudoranges from individual satellites in the constellation are acquired, as it represents the most challenging aspect of obtaining the location coordinates of a GPS receiver. As described above, each SPS satellite broadcasts its unique identity via its particular PRN sequence (e.g., GPS uses a C/A code). The PRN sequence for each satellite is known by the SPS receiver, which compares it with the received composite signal. FIG. 3 shows a block diagram of a conventional SPS receiver. The composite signal from the SPS satellite constellation 30 is received by the RF front end 25, which down-converts the RF signal and converts it to a digital signal stream. The digital signal stream is input to the correlator block 26. Correlator block 26 correlates the incoming digital signal with the PRN sequence replica 29 stored in memory for each SPS satellite.

FIG. 4 illustrates how correlator 26 determines the receive time or arrival time of the signal from an SPS satellite by using the well-understood process of cross correlation. Even with a clear view of the sky, received signals are weak and all satellites broadcast over the same carrier frequency. Most SPS receivers implement multiple correlator blocks in parallel in order to acquire pseudoranges from multiple satellites simultaneously. For the purpose of this discussion, we will focus on the operation of a single correlator block. The composite digital signal that is received by the SPS receiver is input to a delay line made up of multiple delay elements. Corresponding chips (unit of the spreading code) from a PRN sequence replica 29 for the specific satellite that is being acquired are multiplied with the output of each delay element. The product of each delayed signal and chips from the PRN sequence replica 29 are summed and processed in a coordinate generator 28.

FIGS. 5 and 6 illustrates the correlator output of correlator 26 for different received signal powers. In FIG. 5, the received PRN sequence strength or SNR was such that correlator peaks representing the chip corresponding to the arrival time are greater than the noise floor, including peaks representing both white Gaussian noise as well as transmitted signal from a SPS satellite going through a multipath channel. This allows for the successful acquisition of the satellite. The received signal advances through the correlator delay line elements a chip at a time at the chip rate (1.023 MHz). The received PRN sequence will thus only align with the replica PRN sequence every n chips, where n is the number of chips in a complete PRN sequence. For example, n is 1023 in a GPS system such that the PRN sequence period is a millisecond. If the received signal is sufficiently powerful (it can actually be quite weak due to the power of coherently adding 1023 chips), a correlation peak occurs as shown in FIG. 5 that will repeat every 1 ms. This peak corresponds to the arrival time of a complete C/A code from the transmitting satellite, albeit with the clock offset uncertainty. The corresponding transmission time of the GPS signal is determined based on the time-stamp of the transmitted signal to determine the transmission delay, which is then converted according to the speed of light into a pseudorange in coordinate generator 28. When this information is acquired from four or more concurrent satellites, coordinate generator 28 employs the resulting navigational equations to determine the location coordinates of a GPS receiver (or three acquired concurrent satellites for a two-dimensional coordinate).

In practice, the process of cross correlation is much more involved. For example, movement of an SPS receiver relative to the individual satellites causes Doppler shifts. But more significantly, especially when the GPS receiver is located in a weak-signal environment such as indoor or urban canyon locations, path losses and signal multi-path significantly reduce the signal-to-noise ratio of the received signal, limiting the ability to successfully determine the signal travel-time distance and thus any ranging information between the satellite and the GPS receiver. In other words, the cross-correlation process would not yield any discernible peaks. FIG. 6 illustrates the correlator output in such a weak-signal environment. In this case, the correlator peaks are not distinguishable because they do not rise above the noise floor. Because the correlator peaks cannot be identified, it is not possible to determine the travel time necessary to determine the pseudorange information. There can be no position fix in such a weak-signal environment unless further processing is involved as discussed herein.

It is well known that increasing the signal-to-noise ratio via processing gain, and thus improving the ability to acquire the transmitted signals, can be achieved by coherently adding the cross-correlations for a series of PRN sequences. However, in practice, there are many significant technical challenges to increasing the processing gain and receive sensitivity by increasing the processing time. The gain from such coherent integration in conventional SPS receivers saturates at well under twenty PRN sequences (20 milliseconds in a GPS system). This explains the poor indoor and urban-canyon performance of current SPS receivers. There are a number of reasons that limit the coherent correlation times. First, as discussed above, the navigation data overlay such as the 50 Hz data overlay in a GPS system creates a structural boundary at every navigation symbol boundary (every 20-millisecond interval for GPS). As also mentioned earlier, the local clock used in SPS receivers is relatively inaccurate. When correlation times are increased, the clock drift during the length of the correlation period is large enough to degrade processing gain. In addition, all SPS satellite transmissions have a Doppler shift that depends upon their particular location in space relative to the SPS receiver. Moreover, if the SPS receiver is not stationary, its own motion compounds the satellite-motion-induced Doppler shift on the received satellite transmission. Another significant barrier is that SPS receivers are subject to low frequency fading, especially in indoor and urban-canyon locations. Low frequency fading refers to the variation of received signal strength from each satellite in the order of less than 10 Hz. This is due to the variation of signal blockers in line of sight of each of the satellites in the constellation. Movement of people and equipment also contribute to the variation of fading characteristics for each satellite signal. The signal fading significantly lowers the probability of the signals being acquired from a sufficient number of concurrent satellites to determine a position fix. Given these issues, the channel de-correlates both spatially and temporally.

A prior art example of an attempt to extend processing time beyond the navigation data symbol boundary such as the 50 Hz overlay boundary in GPS is described in Krasner (U.S. Pat. No. 6,016,119). Multiple correlator blocks are employed to process signals spanning multiple 50 Hz overlay boundaries. In order to account for the unknown values of the 50 Hz overlay signal, the output from each correlator block is squared, removing the sign. The squaring function removes the 50 Hz phase information, resulting in incoherent processing and significantly limiting the processing gain. As a consequence, this technique is not currently being practiced in commercially available products.

Accordingly, there is a need in the art for improved satellite-based position system (SPS) signal processing techniques in which the TTTF is improved using integration that extends over the navigation bit boundaries.

SUMMARY

An improved signal processing technique is disclosed that advantageously addresses the issues that have vexed previous attempts to coherently integrate a sufficient number of received PRN sequences to acquire a received satellite signal in weak-signal environments. In that regard, it is well known that coherent integration extended over navigation data symbol boundaries must account for the navigation data modulation overlaid onto each group of PRN sequences that forms a given navigation data symbol or baud. To remove this navigation data modulation, the replica PRN sequence should have the conjugate of the navigation data modulation overlay on the corresponding received PRN sequence. In a GPS system, the baseband signal is real (ignoring the effects of noise). Given this real value for the baseband, the navigation data modulation is just a reversal of sign. There is no complex value to conjugate in such a case. But in other SPS systems such as Galileo, the baseband signal (after removal of the carrier) is a complex signal. The applied data navigation is also complex in such a case. Thus, there is a complex value to conjugate for a Galileo replica PRN sequence.

In that regard, the principles and concepts disclosed herein are independent of the particular phase modulation used in a given SPS format. It will be assumed that the replica PRN sequences used herein have the conjugate of the navigation data modulation applied to the corresponding received PRN sequences. As used herein a replica PRN sequence with the appropriate conjugated navigation data symbol modulation is referred to as a "perfect reference" PRN replica sequence.

In a coherent addition of cross-correlations for received PRN sequences with their perfect reference PRN replica sequences, the phase modulation for the navigation data symbols is removed while preserving phase within each cross-correlation. The preservation of phase is of course implicit in a coherent integration. For example, as discussed earlier, one way to integrate across navigation data symbol boundaries in a GPS receiver is to square each individual PRN sequence cross-correlation. While such an operation removes the navigation data phase modulation, it destroys the phase information for that correlation.

In a NAVSTAR system, the perfect replicas are quite convenient since there is no complex value to conjugate. A perfect replica PRN sequence is just the replica PRN sequence but modulated with the appropriate navigation bit overlay. One can thus appreciate that the use of perfect replicas enables an SPS receiver to readily coherently integrate across navigation symbol boundaries. But conventional attempts to coherently integrate using such replicas have failed for reasons that have heretofore not even been recognized, let alone addressed. The following discussion will discuss these heretofore unrecognized issues and provide a remarkably advantageous SPS signal processing technique to address them.

In a time-domain embodiment of this technique, the sampled PRN sequences or the corresponding samples of the perfect replica PRN sequences are resampled to either increase or decrease the resulting effective sampling rate. In other words, a buffer stores the original time samples of the received PRN sequences (or the original samples of the perfect reference PRN replica sequences). These stored time samples are processed to either increase or decrease an effective sampling rate to produce sets of samples, each sample set corresponding to a given effective sampling rate. In particular, a range of effective sampling rates can be tested. The stored time samples are resampled according to each tested sampling rate to produce a corresponding resampled set of time samples. If the received PRN sequences are re-sampled, the corresponding resampled sets of time samples can then be cross-correlated with the appropriate perfect replica PRN sequences and coherently summed to form a candidate cross-correlation result. Alternatively, the perfect reference may be re-sampled to form re-sampled sets that may be cross-correlated with the original time samples of the received PRN sequences and coherently summed. Conventional cross-correlation acquisition techniques as known in the satellite-based positioning system arts may then be applied to the cross-correlations sums to determine if a specific re-sampling (or perhaps the original sampling itself) corresponds to an acquisition (knowledge of the arrival times for the received PRN sequences). The search for the acquisition need not be done in parallel. In other words, the cross-correlation can be performed and tested for a given effective sampling rate before the re-sampling is performed for other effective sampling rates in the search range.

In an alternative embodiment, the original time samples for a received series of PRN sequences are not resampled but instead filtered in the frequency domain prior to their cross-correlations and coherent additions so that a time scale for the original time samples matches a time scale for the perfect replicas. Such frequency-domain-performed re-sampling may instead be applied to the samples of the perfect reference PRN replica sequences.

DETAILED DESCRIPTION

Figure 1A:
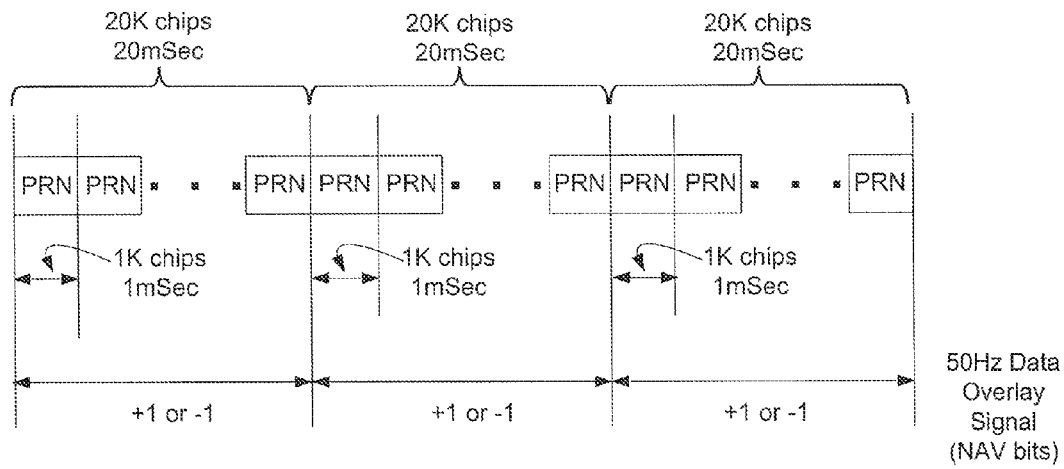
FIGS. 1a and 1b shows the prior art data structure of transmissions of the NAVSTAR Global Navigation Satellite System.
Figure 1B:
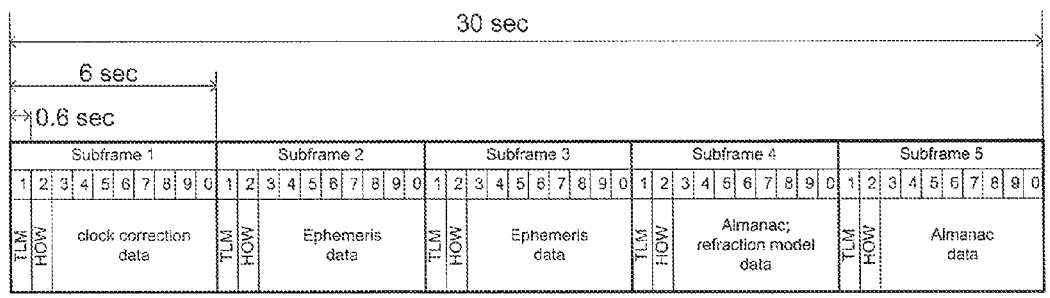
Figure 2A:
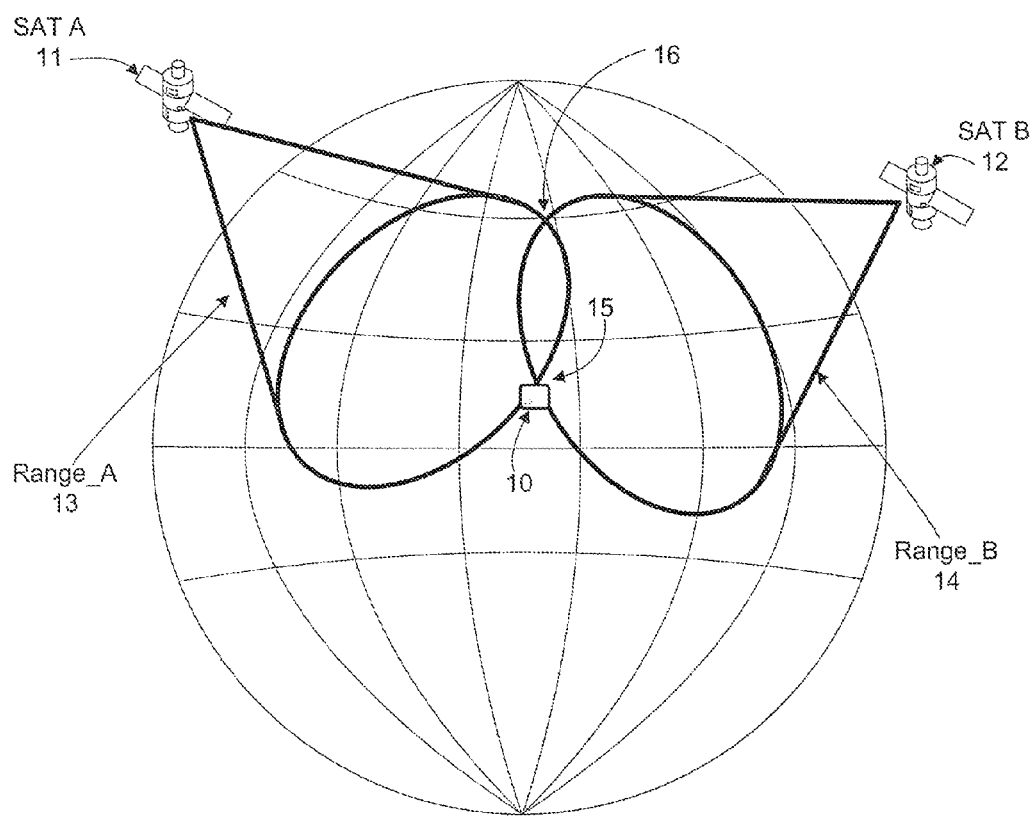
FIGS. 2a, 2b and 2c are operational descriptions of a Global Navigation Satellite System.
Figure 2B:
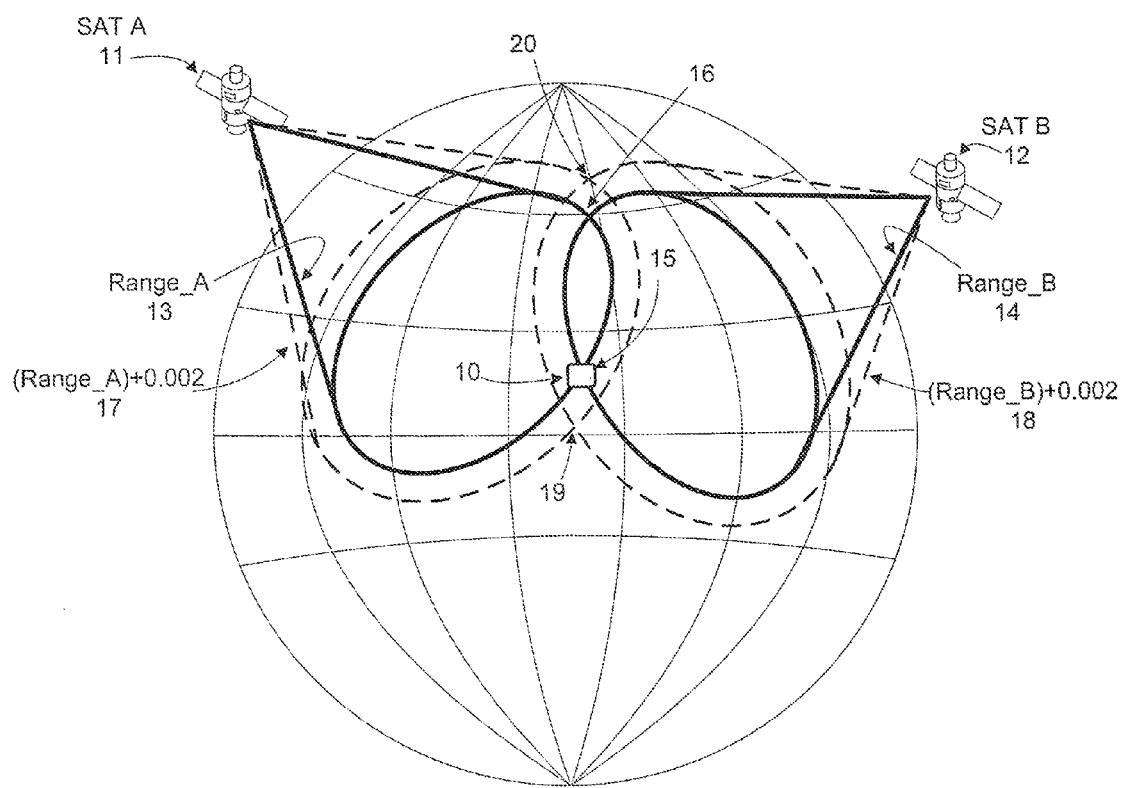
Figure 2C:
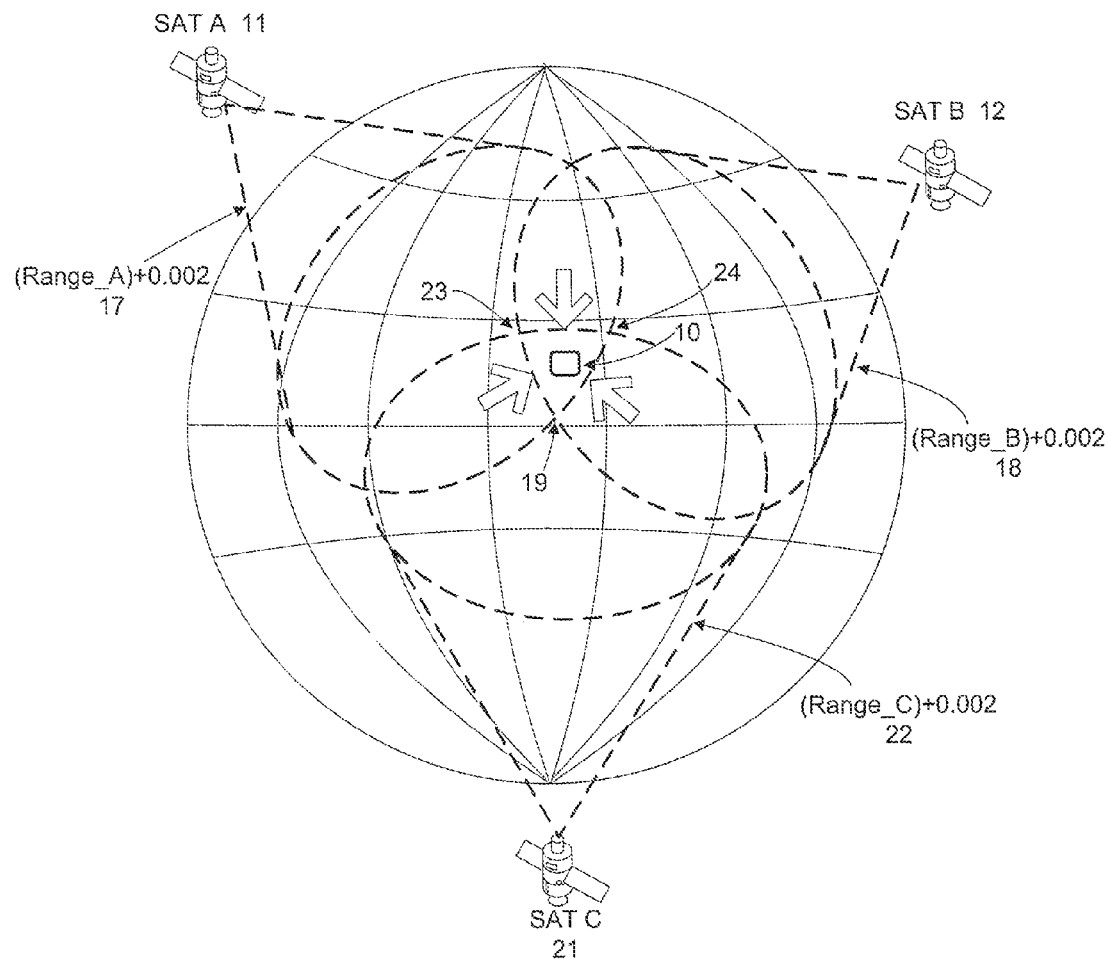
Figure 3:
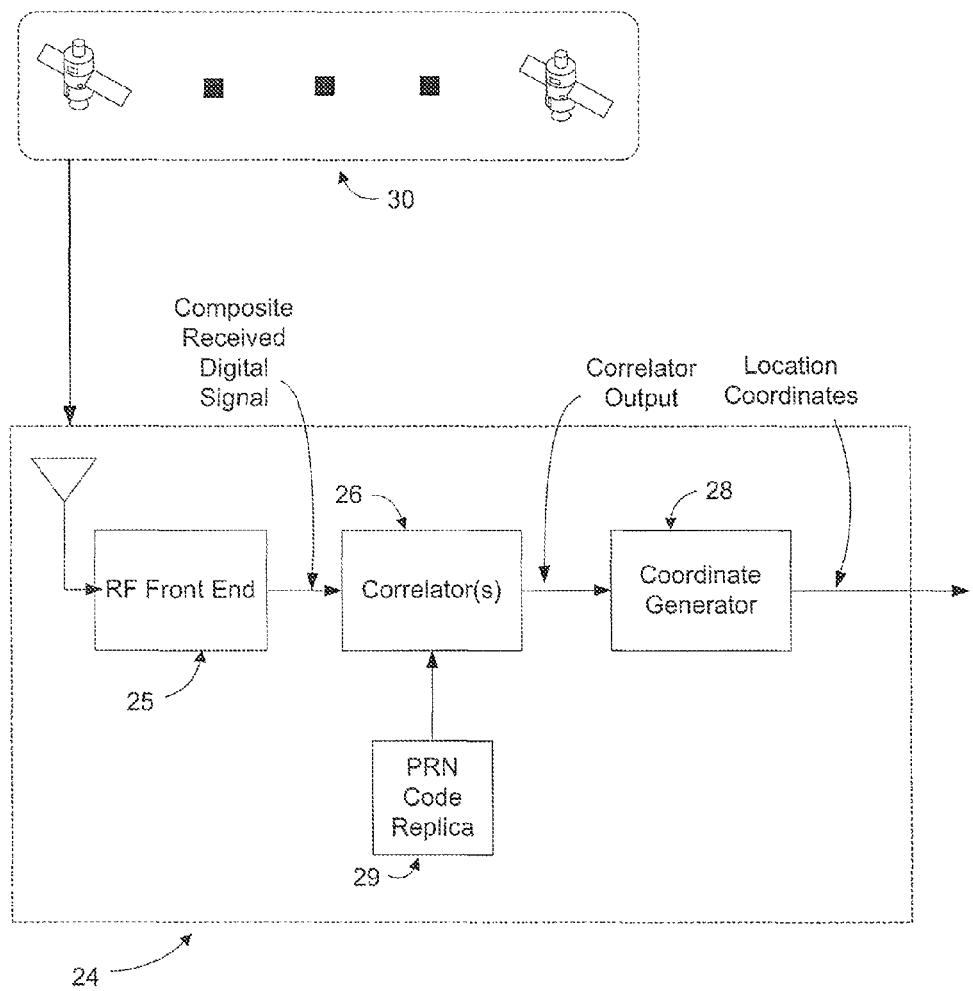
FIG. 3 describes a block diagram of a prior art GPS receiver.

To provide improved time-to-first-fix (TTTF) positioning times, the present disclosure exploits the coherent integration technique disclosed in U.S. application Ser. No. 13/815,789 ("the '789 application), filed Mar. 15, 2013, the contents of which are incorporated by reference herein. In particular, the '789 application disclosed a coherent integration technique that extended the domain of SPS systems to include indoors and other weak-signal environments. However, the '799 application did not limit its technique to such weak-signal environments. This technique is also robust in conventional blue-sky or strong-signal environments. The present application further discusses how coherent integration over the navigation bit boundaries can advantageously reduce the TTFF to just 200 milliseconds or less. Although it was known to use the navigation data to coherently integrate over the navigation bit boundaries, prior art attempts have always failed in achieving the promise of such integration. The following discussion will describe the barriers to coherent integration over the navigation bit boundaries so that the technique disclosed herein may be better appreciated. An SPS receiver architecture and corresponding SPS signal processing techniques will then be introduced and discussed to address these issues.

As discussed previously, it is known that the coherent addition of cross-correlations of received PRN sequences with corresponding replica PRN sequences will provide little to no benefit if the phase modulation for the navigation data symbols in a given SPS format is not accounted for. For example, in the case of NAVSTAR (GPS), the navigation data symbol comprises 20 consecutive PRN sequences that are modulated with a binary phase modulation scheme (each navigation data symbol thus being a navigation bit). If the replica PRN sequences do not account for this phase modulation, coherent cross-correlation of a series of received PRN sequences comprising consecutive navigation bits of opposite phase will involve destructive interference—one would be better off simply performing a conventional cross-correlation of a single received PRN sequence.

The replica PRN sequences disclosed herein may be phase modulated responsive to a conjugation of the applied navigation data symbol phase modulation on the corresponding received PRN sequences to form perfect reference PRN replica sequences such that the cross-correlation for each individual received PRN sequence is coherent yet the applied navigation data symbol phase modulation is removed. Alternatively, the perfect reference may simply comprise the PRN replica sequences with the navigation data modulation overlay (no conjugation). The cross-correlation process itself would then be conjugated to prevent destructive interference from the navigation data modulation that is overlaid onto the transmitted PRN sequences from the satellites.

In a NAVSTAR system, the perfect replicas are quite convenient since 1*1 equals −1*−1. In other words, the perfect replica PRN sequences have the same navigation bit phase modulation as used by the corresponding received PRN sequences. For example, if a given received PRN sequence is part of a zero-degree-phase-shifted navigation bit, the corresponding perfect replica PRN sequence has no phase shift as well. But if a given received PRN sequence is part of a 180-degree-phase-shifted navigation bit, the corresponding perfect replica PRN sequence also has such a 180 degree phase shift relative to an unshifted perfect replica. But the perfect replica in SPS systems in which the navigation data symbol phase modulation schemes produce complex values would not have the same phase modulation as used by the corresponding received PRN sequence. Instead, the conjugate is applied as discussed above. To form the perfect replica, a perfect reference generator requires access to the current navigation data. This is routinely provided in "extended ephemeris" or "assisted GPS" systems. However, the prior art would use the navigation data not to modulate replica PRN sequences but instead to use the navigation data in the navigation equations used to determine a position fix. In sharp contrast, a perfect generator as disclosed herein does not care what the navigation data itself is—it just needs the modulation scheme with regard to its overlay onto the transmitted PRN sequences. For example, suppose a receiver is going to use the advantageous signal processing techniques disclosed herein to coherently integrate the cross-correlation of 500 received PRN sequences from a GPS satellite. If the first received PRN sequence happened to be the beginning sequence in a navigation bit, these 500 received PRN sequences would correspond to 25 navigation bits. To generate the perfect reference, a perfect reference generator knows the PRN code for a given satellite. Given this PRN code, the perfect reference generator can then generate samples of it—plainly, such sampling is constructive in that the PRN code is just a digital expression (it is not a actual RF signal that one receives using a receiver) Such samples may then be repeated for each replica PRN sequence. But one cannot just replicate these samples if the integration will extend over a navigation symbol boundary. So the samples are overlaid with the appropriate navigation data modulation (in this example, 25 bits of GPS navigation such that the samples are either multiplied by +1 or −1 depending upon the particular bit value). Should complex modulation be used, it is conjugated as discussed above. Alternatively, such conjugation may be accounted for in the cross-correlation process.

Although the prior art never used the term "perfect replica" as used herein, it was known that the navigation data symbol modulation needed to be accounted for if an SPS receiver were to coherently cross-correlate a series of received PRN sequences with replica PRN sequences. In that regard, it is abundantly well known in the signal processing arts that the signal-to-noise ratio (SNR) for a weak received signal can be improved through extended coherent integration. If a received SPS sequence is too weak to provide a detectable cross-correlation peak on its own, it is thus well known that coherently cross-correlating a sufficient number of such received SPS sequences with the appropriate PRN replica sequences might provide a detectable cross-correlation peak. For example, if the coherent addition of the cross-correlations for 50 received PRN sequences does not provide a sufficient SNR, then perhaps coherently adding 100, 200, 500, or even 1000 or more cross-correlations may lead to the necessary SNR for acquisition. The number of received PRN sequences that must be cross-correlated and coherently summed to achieve acquisition (a detection of a cross-correlation peak in the resulting coherent addition) is denoted herein a "sufficient series of received PRN sequences."

Despite this knowledge, conventional techniques to cross-correlate each PRN sequence in a sufficient series of received PRN sequences with the corresponding perfect replica PRN and then coherently integrate the individual cross-correlations (whether performed in the time domain or in the frequency domain) have been unsatisfactory. The gain from the coherent addition saturates—a sufficient series of received PRN sequences can never be reached, no matter how long the SPS receiver integrates. There are two main reasons for this failure. A first issue is the receiver sampling rate whereas a second issue is the Doppler shift of the received PRN sequence. The receiver sampling rate will be discussed first.

Receiver Sampling Rate

A received PRN sequence is digitized prior to its cross-correlation. This digitization occurs responsive to the receiver clock. The digitized samples thus correspond to a time frame established by the receiver clock. The SPS receiver clocks are mass produced and directed to ordinary consumers; their cost must be kept low. Of course, "you get what you paid for" so SPS receiver clocks are usually relatively inaccurate in comparison to the expensive atomic clocks used on the SPS satellites. As compared to the time established by the SPS satellites, an SPS receiver clock will tend to cycle too fast or too slow—there is a clock offset for the SPS receiver clock as compared to the true time. In that regard, no clock keeps "true" time as they all have some inaccuracy. But the inaccuracy in expensive atomic clocks such as those used in SPS satellites is extremely small. In contrast, a typical SPS receiver clock will either beats too fast or it beats too slow with regard to the true time. The sampling or digitization of the received PRN sequence is thus affected by the receiver sampling rate error.

Figure 7:
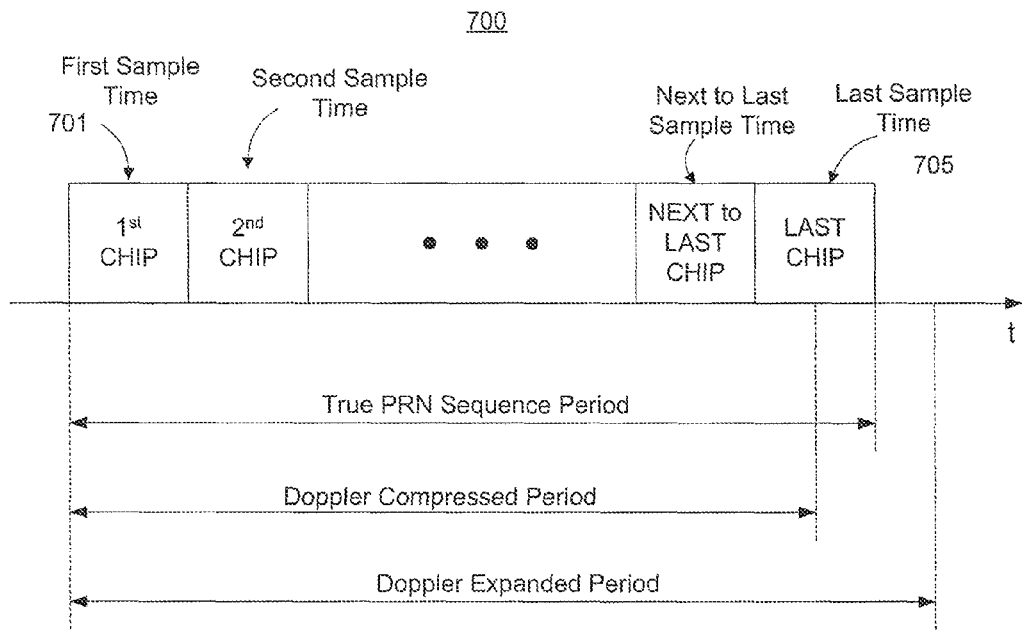
FIG. 7 illustrates the sampling of a received PRN sequence and the effects of Doppler shift.

To better appreciate the deleterious effects of the SPS receiver sampling rate error, an individual received PRN sequence 700 is shown in FIG. 7. Received PRN sequence 700 is assumed for the purposes of discussion to have no Doppler shift. The sampling rate needs to be sufficient such that each chip is sampled at least once (in reality, practical sampling schemes require multiple samples per chip). For received PRN sequence 700, the sampling rate is just once per chip as shown. The time scale for the received PRN sequence 700 is the "true" time scale since it was received with no Doppler shift whereas the samples are taken according to the receiver SPS clock time frame. With regard to any given received PRN sequence such as sequence 700, the sampling rate error has relatively little effect. For example, suppose received PRN sequence 700 comprises 1023 chips. If sequence 700 is 1 millisecond long, then samples are taken at a rate of 1.023 MHz. A typical SPS receiver clock is accurate to around 25 ppm. Thus, instead of beating exactly at 1.023 MHz, a typical SPS receiver clock will cycle at 1.023 MHz+/−25 Hz. Suppose a first sample 701 samples exactly in the middle of the first chip. In other words, it will be assumed that first sample 701 is aligned where it should be with the true time scale despite the SPS receiver sampling rate error. Such a clock will then have cycled 1023 times before a last sample 705 is taken of the last chip. At an inaccuracy of 25 ppm, the time scale final sample 705 is thus offset from the true time by 25 ppm*1023 cycles. Each chip period is approximately 1 μs long. Thus, the final sample will be offset from where it should be based upon the true time scale by approximately 2.5% of a chip. So instead of being exactly in the middle of the final chip, final sample 705 is either advanced or retarded by just 2.5% of the chip period. With regard to the timing for PRN sequence 700, such a sampling rate error causes no effect in the resulting cross-correlation as each chip was correctly sampled.

But suppose 40 consecutive PRN sequences are sampled with such a 2.5% chip offset at the end of each PRN sequence. By the $20^{th}$ PRN sequence, the sampling rate is one-half a chip displaced, which sharply reduces the correlation peak for this $20^{th}$ PRN sequence. By the $40^{th}$ PRN sequence, the sampling rate is a full chip displaced, which completely destroys the cross-correlation for the $40^{th}$ PRN sequence. The SPS receiver sampling rate error thus quickly nullifies the gain from coherent integration of multiple cross-correlations. One can thus suppose that, if only an SPS receiver were configured with an atomic clock, then this sampling rate issue is solved. But it has been found that even if an atomic clock is used, the gain from coherent integration quickly flattens out—relatively little SNR is achieved no matter how long one coherently integrates despite the use of such an accurate SPS clock to time the digitization of the received PRN sequences. Such a failure is caused by the second issue, which is the Doppler shift of the received PRN sequences.

Doppler Shift

The need to account for the Doppler shift of the received SPS satellite signals is well known. In that regard, a conventional SPS receiver such as a GPS receiver will search through a number of frequency bins to acquire and track a received satellite signal. But such searching of frequency bins occurs after a received PRN sequence has been sampled. But the Doppler shift causes the same effect on the sampling as does the receiver's clock inaccuracy discussed above. For example, suppose an SPS receiver has a very accurate clock such as an atomic clock. The effect of the clock drift for such a clock is negligible unless enormous numbers of PRN sequences are being cross-correlated and coherently summed. But the SPS clock accuracy cannot change the physics of the Doppler effect: the apparent period or length of a received PRN sequence is either increased or decreased by the Doppler. In other words, the time scale for the received PRN sequence is either too fast or too slow. For example, if a satellite is moving toward an SPS receiver, the Doppler shift is positive. The received PRN sequences will not have their nominal length in such a scenario but instead will be compressed in time (having a faster apparent time scale). Even if the SPS receiver clock ticks perfectly (no sampling rate errors), the Doppler compressed PRN sequence period will be too short as shown in FIG. 7. Conversely, if a satellite is moving away from an SPS receiver, the Doppler shift is negative (the apparent time scale for the received PRN sequences is too slow). The received PRN sequences will again not have their nominal length in such a scenario but instead will be expanded in time as also shown in FIG. 7.

For example, suppose the expansion or compression is the same as the sampling rate example: 2.5% of a chip period. That means that even if first sample 701 is centered perfectly in the first chip, the final sample 705 will be displaced by 2.5% of the chip period from where it should have been sampled (if Doppler shift were accounted for). The same failure in coherent integration as discussed above with regard to the sampling rate will level off the coherent integration game by just twenty PRN sequences. A navigation data symbol boundary may not even have been crossed by the $20^{th}$ PRN sequence yet there is no benefit from further coherent integrations. The effects of Doppler shift and receiver sampling rate makes the perfect replica PRN sequence desynchronized with the samples of the received PRN sequences. For this reason, conventional coherent integration techniques have always been unsatisfactory and do not boost performance in weak-signal environments.

EXAMPLE EMBODIMENTS

The deleterious effects of Doppler and sampling rate on the sampling of the received PRN sequences in an SPS receiver are avoided by a constructive resampling. The resampling is "constructive" because one cannot go back in time and actually sample the received PRN sequences at the proper sampling rate. But because of sampling rate and the Doppler shift, the received PRN sequences will typically be sampled at too fast of a rate or too slow a rate. If the received PRN sequences could have been sampled at the proper clock rate—one that has no sampling rate offset due to receiver clock inaccuracies and is also increased or decreased to account for Doppler-shift-induced expansion or compression of the apparent time scale for the received PRN sequences—then the samples of the received PRN sequences and corresponding samples of the perfect reference PRN sequences are synchronous. This re-sampling may alternatively be performed on the perfect reference samples. Thus, the following discussion will assume that the received PRN sequences are re-sampled without loss of generality in that the same re-sampling could instead be performed on the perfect reference.

Given such a re-alignment of the re-sampled received PRN sequences with the samples of the perfect reference sequences, a sufficient series of received re-sampled PRN sequences may then be cross-correlated with the appropriate perfect replica PRN sequences and coherently added to solve the weak-signal dilemma for the satellite-based positioned system arts as discussed in the '789 patent. But note that this technique is equally robust to blue-sky conditions. In other words, a conventional receiver located in a strong-signal environment may obtain sufficient satellite signals to obtain a position fix without the use of re-sampling. But this conventional receiver faces the TTTF problems discussed above with regard to identifying the preamble. In contrast, a receiver using the resampling technique disclosed herein need only integrate over a sufficient number of PRN sequences as to make a false identification unlikely. Since the receiver has the perfect reference, the navigation bits are known such as through the use of extended ephemeris techniques. But what is unknown is the relationship between the received PRN samples and their counterparts in the perfect reference.

With regard to this uncertainty, suppose that a receiver configured with the advantageous coherent integration techniques disclosed herein awakes its RF front end so as to sample a sufficient number of PRN sequences from a satellite. For example, suppose an SPS receiver samples 200 milliseconds of a received PRN sequence. If the navigation bits extend over 20 milliseconds, such a series of samples will thus extend across ten navigation bits. The receiver does not know a priori the relationship between its samples and the corresponding perfect reference samples. Indeed, it is the determination of this unknown timing relationship that will be used to determine the unknown position of the receiver. But the receiver does know the TOW for the current subframe from the satellite due to its use of extended ephemeris. The receiver must then find the relationship of the received PRN sequence samples to this TOW.

With regard to its received PRN sequence samples, the receiver took them over some sampling time that includes a sufficient number of navigation bits. In one embodiment, this sampling time is 200 milliseconds as discussed above. The receiver has a local time at the beginning of its sampling period, which may be designated at T0. But this T0 has the unknown relationship to the much more accurate satellite time as discussed earlier. Thus, the receiver cannot simply use a perfect reference beginning at time T0 as the perfect reference is based upon the satellite's time scale, not the local one. Instead, the receiver uses a longer sequence for the perfect reference such as one beginning at some time prior to T0 such as T0 minus 100 milliseconds. Similarly, the perfect reference does not end at T0 plus 200 milliseconds (or whatever the length is of the received PRN sequence samples) but instead extends some delta beyond this such as T0 plus 200 milliseconds plus 100 milliseconds. In this fashion, there is a perfect reference search space that begins prior to the receiver' sampling period and extends after the end of the sampling period.

The receiver then proceeds to search across the perfect reference search space using a window matching the sampling period. Since the search is with regard to the navigation bits, the receiver may increment the perfect reference search window by the navigation bit period. This search may be better understood with regard to some examples. For example, suppose that the receiver sampling period is 200 milliseconds starting at a local time T0 and that the navigation bits extend across 20 PRN sequences, with each sequence being 1 millisecond (ms). In addition, suppose that the delta before and after the sampling period for the perfect reference search space is 100 ms. The perfect reference search window would thus be T0 in perfect reference time minus 100 ms through T0 in perfect reference time plus 200 ms (the sampling period) plus 100 ms.

The receiver may then begin resampling the received PRN sequence samples and correlating them with a matching length of samples within the perfect reference search window. If a correlation peak does not occur, the starting time for the matching length of samples within the perfect reference search window may be incremented (or decremented) by the navigation bit period (20 ms) and the correlation repeated. In this fashion, the receiver will determine where the received PRN sequences fits within the perfect reference search window. In other words, the receiver then determines the transmission time for the received PRN sequences. Note also that the TTTF window is greatly shortened with regard to a conventional TTFF: for example, suppose the receiver sampling period covers just two navigation bits. Even when the receiver determined the correlation peak, there would be considerable uncertainty of the time relationship between the received samples and the perfect reference search window. For example, suppose the perfect reference search window covers the following sequence of navigation bits: 1011011. If the received samples correspond to a two-bit navigation bit overlay of 11, then those two "one" bits may occur in two different times within the perfect reference search window: after the first two bits of 10, and after the first five bits of 10110.

But when the receiver sampling window extends across a sufficient number of navigation bits such as 10 navigation bits, the probability of the same 10 bits occurring more than once in the navigation search window reduces dramatically. For example, if one considers the nav bits to be randomly distributed with regard to the use of ones and zeroes, the four possible two-bit sequences (00, 10, 01, and 11) each has a $½^2$ probability of being misidentified. But if 200 PRN sequences are used extending over 10 navigation bits, the probability of false identification becomes neglible: $½^{10}$. This probability can be even further reduced if the integration extends longer such as over 300 milliseconds, in which case the probability of false identification becomes just $½^{15}$, and so on.

Regardless of how many nav bits the receiver sampling window extends over, note that the resulting receiver is freed from having to wait until it identifies a subsequent preamble. Indeed, the receiver need not identify any preamble whatsoever. It need merely search through the perfect reference search window as discussed above. This is remarkably advantageous in that the RF front end for the SPS receiver need only wake up during the receiver sampling window. As discussed above, this sampling window may extend across just 10 navigation bits or even fewer bits. What is even more remarkable is that this same process may be periodically repeated during an active navigation session for a user. In other words, whereas a conventional SPS receiver such as a GPS receiver needs to continually receive the GPS signals while a user is navigating, the advantageous receiver disclosed herein need merely periodically wake up and sample the received PRN sequences across its sampling window. One can readily appreciate that the length of time between periodic wakeups depends upon the SPS receiver's speed and current conditions. For example, if it known that a receiver should be making a turn such as when the user is employing the receiver for automotive navigation, the periodic wakeups can be more frequent to properly navigate through the turn. But if a user is on a road and no turns are expected, the receiver can take much longer periods in which it shuts down its RF front end and does no SPS signal sampling.

The SPS receiver may correlate simultaneously for three satellites (to get a 2D position fix) or for four satellites (to get a 3D position fix). Each pseudorange to the satellites is calculated using the advantageous resampling technique discussed herein. With these concepts in mind, note that the resampling of the received PRN sequences (or the perfect reference) can be performed in the time domain or in the frequency domain. A time-domain embodiment will be discussed first.

Time Domain Re-Sampling

As discussed earlier, extended ephemeris techniques are known. For example, a cellular telephone may receive the navigation data from the base station and need not rely on the satellites for its transmission. Since extended ephemeris techniques are known, it will not be discussed further herein how a receiver obtains the extended ephemeris. But given its receipt, the receiver may then construct sample of a perfect reference. In that regard, the principles and concepts disclosed herein are independent of the particular phase modulation used in a given SPS format. It will be assumed that the replica PRN sequences used herein have the conjugate of the navigation data modulation applied to the corresponding received PRN sequences. As used herein a replica PRN sequence with the appropriate conjugated navigation data symbol modulation is referred to as a "perfect reference" PRN replica sequence.

In contrast to known extended ephemeris techniques, what was not known was an ability to coherently integrate across navigation bit boundaries using a perfect reference. As discussed above, a received PRN sequence can be compressed or expanded in time depending upon its Doppler shift. Such a compression or expansion is with reference to a "true" time for the received PRN sequences in the absence of a Doppler shift. Such misalignment of the received PRN sequences with the true time scale is independent of the SPS receiver clock rate. But as also discussed above, the SPS receiver clock rate itself may be too fast or too slow with reference to such a true time scale. On the other hand, the perfect reference PRN sequence replicas are generated according to the true time scale. The perfect reference PRN sequence replicas can be cross-correlated with the corresponding received PRN sequences in either the time domain or the frequency domain. Analogous cross-correlation in the time or frequency domains is well known with regard to the conventional cross-correlation of a single received PRN sequence with a replica PRN sequence.

But regardless of whether the cross-correlation is performed in the time or frequency domain, the perfect reference PRN sequence replicas are generated as time samples corresponding to the time samples of the received PRN sequences. Prior to a position fix, the sampling rate for a receiver is unknown. In generating a perfect reference PRN sequence replica in such a case, the SPS receiver thus has no information on how fast or how slow its clock is ticking. It can only assume that the clock is sampling according to a nominal or intended sampling rate. The perfect reference PRN sequence replicas are thus generated according to this intended sampling rate. But such an intended sampling rate will fail because it does not account for the Doppler shift or the SPS receiver sampling rate error. As discussed above, the receiver uses a perfect reference search window through which it searches responsive to the receiver sampling period. The following discussion concerns the correlation between the resampled PRN sequences samples and a particular range within the perfect reference search window. If this correlation does not produce a correlation peak, the range within the perfect reference search window is incremented (or decremented) by, for example, the navigation bit period so that a new correlation may be performed. In this fashion, the perfect reference search window is explored until a correlation peak occurs between the resampled samples and the current search range within the perfect reference search window.

To account for the Doppler shift and the SPS receiver sampling rate, the effective sampling rate for the time samples of the received PRN sequences is adjusted to form re-sampled time samples of the received PRN sequences. For example, suppose that a series of fifty received PRN sequences are going to be cross-correlated and the cross-correlation results coherently added. If the intended sampling rate was one sample per chip and the PRN sequence length is 1023 chips, the fifty received PRN sequences would be represented by 50*1023=531,960 samples (each sample being a complex number having an I and Q component). But if sampling rate were too high, the sampling rate offset will quickly mean that a given sample is not of the intended chip for a given received PRN sequence. For example, if the sampling rate is too high, a sample that was believed to be of the ith chip in the later ones of the received PRN sequences is actually of an (ith−1) chip or an (ith−2) chip, and so on. The corresponding perfect replica PRN sequence sample is then of the wrong chip, which destroys the resulting cross-correlation result.

Conversely, if the sampling rate were too slow, the reverse problem occurs. The sampling range will then extend beyond the intended fifty PRN sequences. Moreover, the sampling rate offset will mean that, as the sampling sufficiently proceeds across the received PRN sequences, an intended sample of an ith chip is actually of an (ith+1) chip or an (ith+2) chip, and so on.

Figure 8:
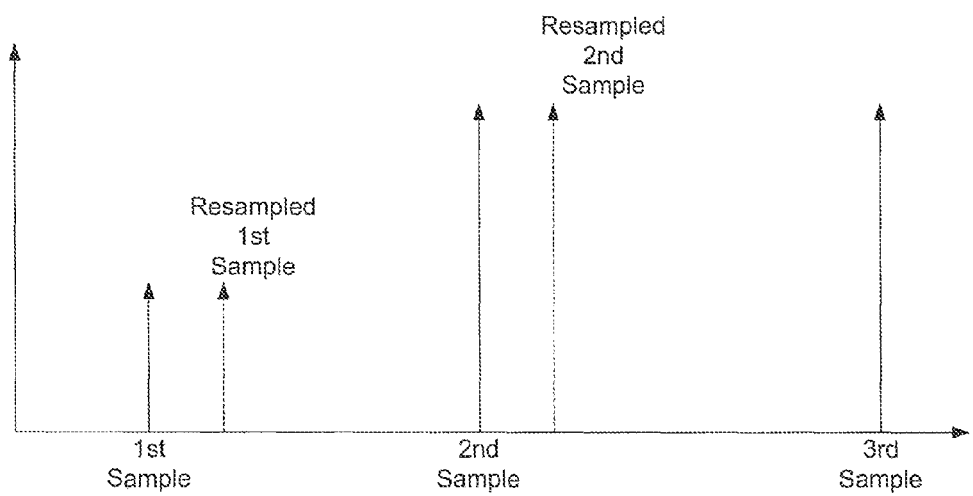
FIG. 8 illustrates an example re-sampling for a series of original time samples.

It is of course unknown prior to acquisition whether the sampling rate should be increased or decreased. Thus a sampling frequency range can be tested at various points. For example, in one embodiment, the sampling frequency search range about the nominal sampling frequency is 5 Hz, tested in $\frac{1}{10}$ of a Hz increments. For example, in a GPS system, a nominal sampling rate might be eight samples per chip, which would be an 8 MHz nominal sampling rate. This nominal sampling rate would be effectively varied according to the effective sampling rates tested within the sampling rate search range. The original samples are interpolated to produce a set of re-sampled time samples. Each re-sampling corresponds to an effective sampling rate in that the sampling rate is constructively altered from that used to actually obtain the original samples. The original samples are taken at some nominal sampling rate (albeit with an unknown sampling rate error). For example, the nominal sampling rate may be 8 samples per chip. Each sample was thus intended to be separated in time by $\frac{1}{8}^{th}$ of a chip period. Given such a nominal sampling rate, an interpolation may be performed to re-sample for points at a slightly lower clock rate. For example, suppose one has a first sample, an adjacent second sample, and a subsequent third sample as shown in FIG. 8. If one wants to slightly slow the effective sampling clock, the re-sampled first time sample to replace the original first sample may equal a linear interpolation of the first and second original samples. This would be a weighted value of the first and second samples based upon the desired effective sampling rate offset. Since the offset is such that the re-sampled values are just slightly slower than the original values, such an interpolation would more heavily weight the first value as opposed to the second value as shown. Other types of interpolation may be used. An analogous interpolation would be used to replace the original second sample with a re-sampled second sample, and so on to complete the re-sampling. If one instead wants to re-sample with a faster effective sampling rate, some of the beginning or ending samples are discarded and the remaining samples re-sampled accordingly.

Each tested effective sampling rate across a search range is then used to produce a corresponding re-sampling of the series of received PRN sequences. Each resulting re-sampled series of received PRN sequences is cross-correlated with corresponding samples of the perfect reference PRN replica sequences and coherently summed. The tested effective sampling rate that provides the maximum value for a cross-correlation is used to acquire the received PRN sequences (determine their time of arrival). Given this acquisition, a pseudorange can then be obtained as is conventional in the SPS arts. But what is not conventional is the resampling that enabled this coherent addition by appropriately aligning the perfect reference PRN sequences with the received PRN sequences.

Figure 4:
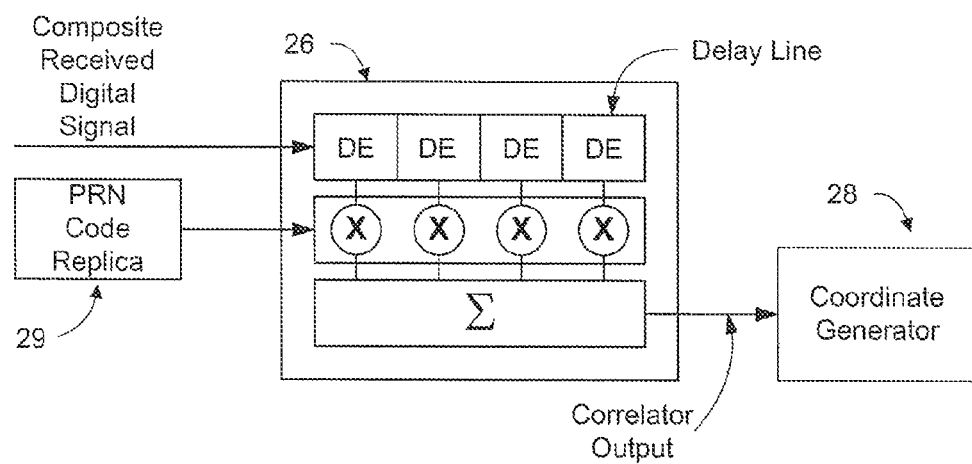
FIG. 4 describes a prior art correlator block diagram.
Figure 5:
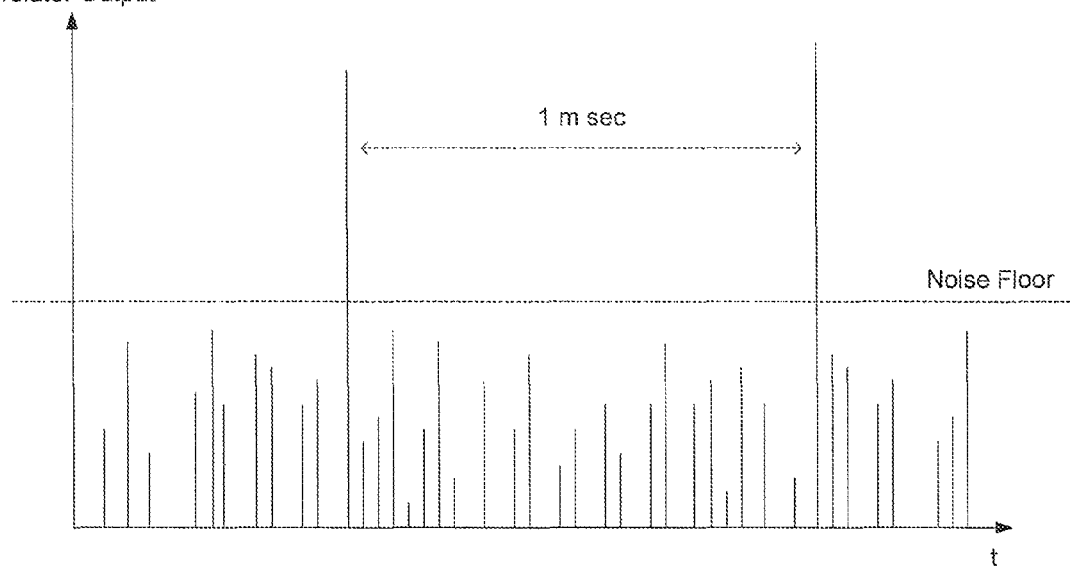
FIG. 5 is a plot of the correlator output of a prior art GPS receiver in a strong-signal environment.
Figure 6:
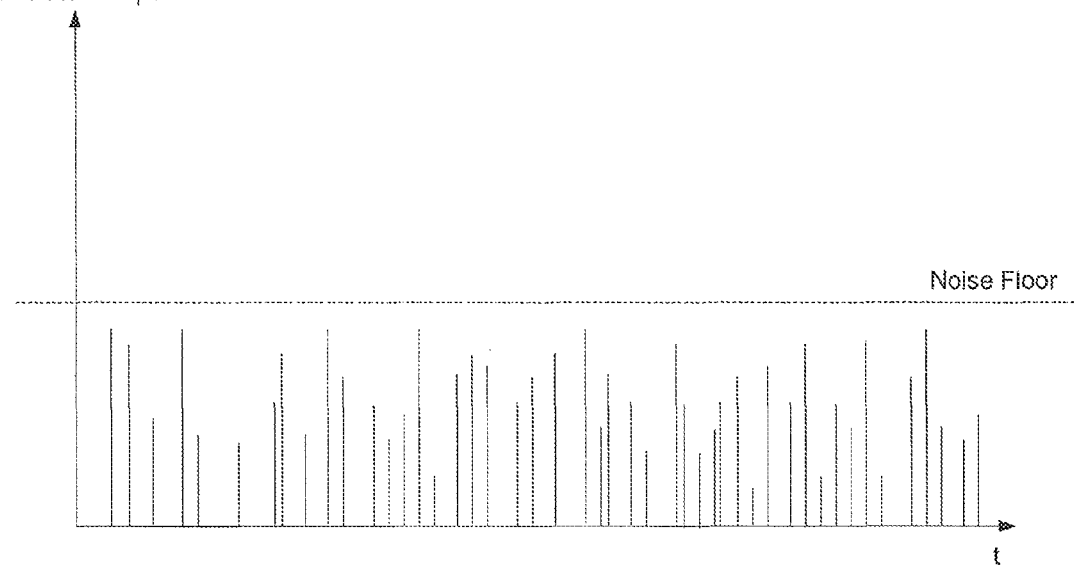
FIG. 6 is a plot of the correlator output of a prior art GPS receiver I a weak-signal environment.
Figure 9:
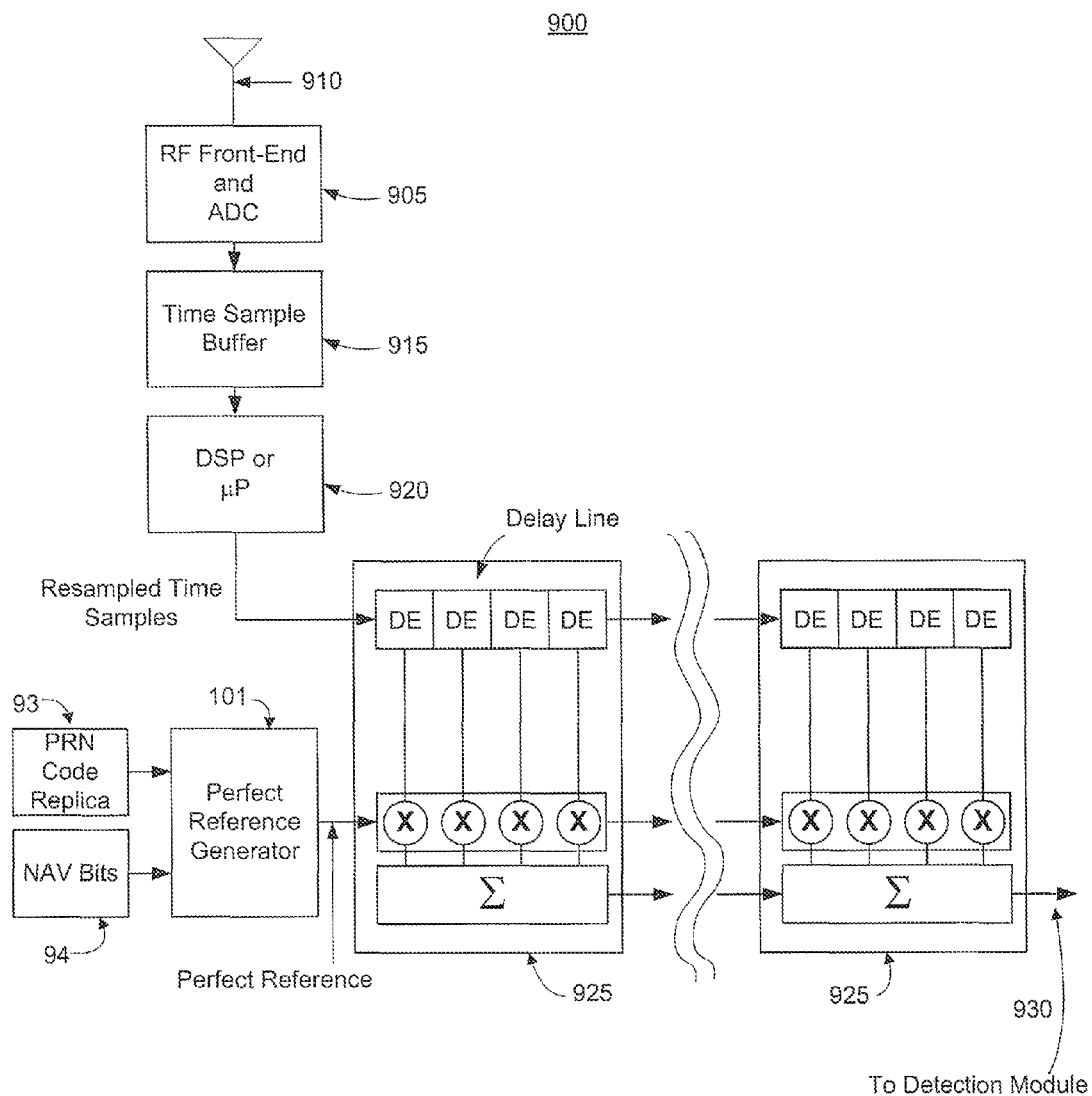
FIG. 9 is a block diagram of an SPS receiver configured to re-sample in accordance with a first embodiment.
Figure 10:
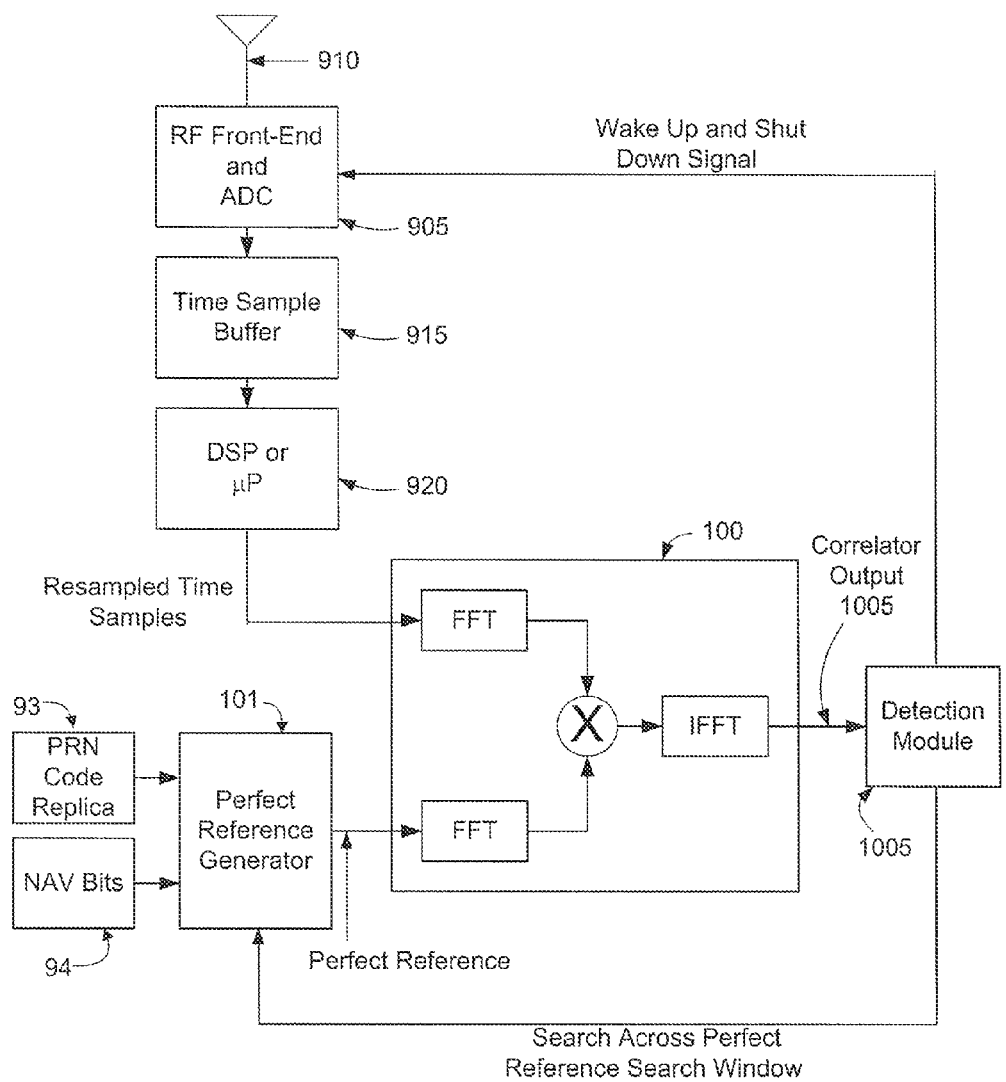
FIG. 10 is a block diagram of an SPS receiver configured to re-sample in accordance with a second embodiment.

FIG. 9 illustrates an example SPS receiver 900. An RF front end and analog-to-digital converter (ADC) 905 receives the transmitted PRN sequences on an antenna 910 and digitizes the received PRN sequences to form time samples of the received PRN sequences. The resulting original time samples are stored in a sample buffer 915. A microprocessor or DSP 920 may then re-sample the original time samples at each of the desired test points or values across a search range for an effective sampling rate. The re-sampled time samples for a given tested effective sampling rate may then be correlated in correlators 925. Correlators 925 are shown separately to comport with the description of correlator 26 of FIG. 4. In other words, each correlator 925 includes the delay line for a corresponding one of the PRN sequences. If the series of received PRN sequences (as represented by re-sampled time samples) is to be cross-correlated with corresponding samples of the perfect reference PRN replica sequences and then coherently summed, there would be fifty correlators 925. A perfect reference generator 101 receives the navigation bits 94 and the appropriate PRN replica 93 (for one PRN sequences) and produces samples of the corresponding perfect reference PRN sequence replicas for the sampled received PRN sequences. A coherent sum 930 for each effective sampling rate may then be compared to the other coherent sums 930 for the remaining effective sampling rates in a detection module (not illustrated but discussed below with regard to FIG. 10) to find the maximum value and determine the arrival times of the received PRN sequences accordingly. Although such a time-domain cross-correlation is theoretically possible, it is much more convenient to perform the cross-correlation in the frequency domain as shown in FIG. 10 for a SPS receiver 1000.

SPS receiver 1000 is analogous to SPS receiver 900 except that time-domain correlators 926 are replaced by a frequency domain correlator 100. In frequency domain correlator 100, the resampled time samples for the received PRN sequences and the samples for the perfect reference PRN replica sequences are each converted into the frequency domain by, for example, FFT operations. The resulting FFTs may then be multiplied before being converted into a resulting coherent sum 1005 of all the cross-correlations using an inverse FFT operation. In other words, all the cross-correlations for each received PRN sequence with its perfect reference are accomplished by merely multiplying their corresponding FFTs and then performing an IFFT. For this reason, cross-correlation is typically performed in the frequency domain in conventional SPS receivers. A detection module 1010 detects the maximum cross-correlation value and determines the arrival time for the received PRN sequences accordingly. If the correlation does not produce a peak as determined by an appropriate threshold compared to the noise floor, detection module 1010 adjusts the current sample period within the perfect reference search window is and a new correlation taken. This search process through the perfect reference search window is repeated until a correlation peak is detected. But note that the receiver RF front end need sample only within the receiver sampling window. It may then be shut down until the next receiver sampling period. As discussed above, the shut down period between a position fix for one receiver sampling period until another position fix is taken at a subsequent receiver sampling period depends upon the desired navigation accuracy, the receiver speed, and current conditions. This is very advantageous as further discussed above.

Figure 11:
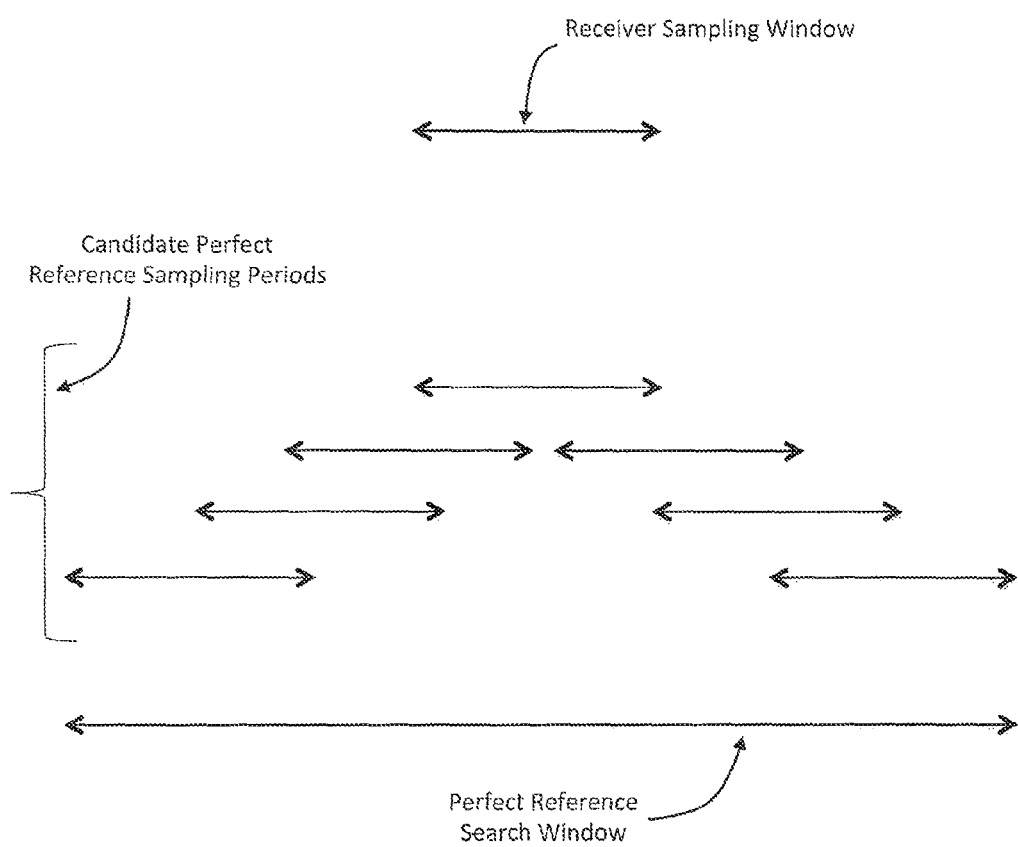
FIG. 11 is a timing diagram for an example receiver sampling window and a corresponding perfect reference search window.

FIG. 11 illustrates an example receiver sampling window and a corresponding perfect reference search window. In addition, a corresponding perfect reference search window for this sampling period is also illustrated. A set of candidate perfect reference sampling periods spans the perfect reference search window. Each candidate perfect reference sampling period is sampled at the nominal sampling rate for the receiver to obtain the same number of samples as taken within the receiver sampling window. The time offset between subsequent candidate perfect reference sampling periods is chosen to be sufficient as to properly search through the perfect reference search window. For example, adjacent candidate perfect reference sampling periods may be offset from each other by a navigation bit period. Detection module 1010 selects for a given candidate perfect reference sampling period during each correlation. If the correlation does not produce a peak, another candidate perfect reference sampling period is selected until a correlation peak is detected.

It will be appreciated that the re-sampling discussed above could instead be practiced on the samples of the perfect reference PRN replica sequences. For example, with regard to receiver 1000, the resampling operation performed by DSP/microprocessor 920 may instead be performed on the perfect reference samples from generator 101. The FFT for the perfect reference would then be an FFT of the re-sampled perfect reference. The samples of the received PRN sequences would then be processed by frequency-domain correlator 100 without any re-sampling. However, the samples of the perfect reference would be re-sampled. Since either the samples of the received PRN sequences or the perfect reference samples can be chosen for re-sampling, the samples that are not re-sampled may be referred to as not-re-sampled samples. In both cases, re-sampled samples are cross-correlated with not-re-sampled samples. If the received PRN sequences are re-sampled, the not-re-sampled samples are the perfect reference samples. Conversely, if the perfect reference samples are re-samples, the samples of the received PRN sequences would be the not-re-sampled samples.

Note that the signal processing techniques may be performed offline—they do not need to be performed in the receiver taking the samples of the received PRN sequences. Instead, such a receiver could upload the received samples to a server or other external node that would then perform the resampling and coherent addition discussed herein. Such offline processing is attractive for applications such as handsets that may not have sufficient computing power to perform the re-sampling and coherent addition of the resulting cross-correlations.

Frequency Domain Re-Sampling

As yet another alternative, the effective resampling of the received PRN sequences may be performed in the frequency domain through an appropriate filtering operation. As discussed with regard to the time-domain resampling, the re-sampling filtering may be performed on either the FFT of the samples for the received PRN sequences or on the FFT of the perfect reference. For example, in SPS receiver 1000, the time-domain re-sampling by DSP/microprocessor 920 would be omitted. Instead, a re-sampling filter would be inserted between the FFT operation and the subsequent multiplication for either the received PRN sample path of the perfect reference path. As discussed with regard to the time-domain embodiment, a frequency domain re-sampling need not be performed by the receiver taking the samples of the received PRN sequences.

As discussed earlier, an SPS receiver may be readily configured to correlate for a plurality of satellites simultaneously using the re-sampling techniques discussed herein. For each satellite, the SPS receiver may generate the perfect reference and resample either it or the received signal to generate the pseudorange accordingly. In this fashion, an SPS receiver can largely be powered down and merely wake up periodically to receive the satellite signals over the desired number of navigation bit boundaries (e.g., ten navigation bit boundaries, which is just 200 milliseconds in a GPS embodiment. In that regard, it is conventional for mobile devices to now include inertial sensors such as accelerometers. If an SPS receiver's inertial sensors indicate no movement, then the GPS receiver front end may remain powered down until the inertial sensors indicate that sufficient movement has taken place. In this fashion, the rate upon which an SPS receiver wakes up to perform the accelerated position fixes practiced herein may be tailored to the velocity or acceleration of the SPS receiver.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalent

We claim:

1. A satellite-based positioning system (SPS) receiver, comprising:
   an RF front end configured to receive a series of PRN sequences from an SPS satellite responsive to an assertion of a wakeup signal, the received series of PRN sequences having a phase modulation responsive to a navigation bit overlay;
   an analog-to-digital converter (ADC) configured to sample the series of received PRN sequences across a sampling window to provide original time samples responsive to an SPS clock having an SPS sampling rate;
   a perfect reference generator configured to generate perfect reference samples for a plurality of candidate perfect reference sampling periods within a perfect reference search window comprising a series of perfect reference PRN sequences, wherein the perfect reference PRN sequences have a conjugate phase modulation that is the complex conjugate of the phase modulation for the navigation bit overlay;
   a re-sampler configured to re-sample the original time samples according to a first effective sampling rate different from the SPS sampling rate to provide first re-sampled time samples; and
   a cross-correlator configured to coherently cross-correlate the first re-sampled time samples with the perfect reference samples for a selected one of the candidate preference reference sampling periods to provide a first cross-correlation sum;
   and a detection module configured to assert the wakeup signal at the start of the sampling window and to de-assert the wakeup signal at the end of the sampling window, wherein the detection module is further configured to adjust the selection of the candidate perfect reference sampling period to search the plurality of candidate perfect reference sampling periods to detect a first peak value in the first cross-correlation sum.

2. The SPS receiver of claim 1, wherein the re-sampler is configured to re-sample the original time samples by interpolating between adjacent samples responsive to the first effective sampling rate.

3. The SPS receiver of claim 1, wherein the cross-correlator is a frequency-domain cross-correlator.

4. The SPS receiver of claim 1, wherein the cross-correlator is a time-domain cross-correlator.

5. The SPS receiver of claim 1, wherein the SPS receiver comprises a GPS receiver.

6. The SPS receiver of claim 1, wherein the re-sampler comprises a micro-processor.

7. The SPS receiver of claim 1, wherein the re-sampler comprises a DSP.

8. The SPS receiver of claim 1, wherein the series of received PRN sequences comprises at least fifty received PRN sequences.

9. The SPS receiver of claim 8, wherein the series of received PRN sequences comprises at least 200 received PRN sequences.

10. The SPS receiver of claim 9, wherein the series of received PRN sequences comprises at least 500 received PRN sequences.

11. The SPS receiver of claim 1, wherein the re-sampler is further configured to re-sample the time samples according to a second effective sampling rate different from the SPS sampling rate and the first effective sampling rate to provide second re-sampled time samples, and wherein the cross-correlator is configured to coherently cross-correlate the second re-sampled time samples with the perfect reference samples of the selected candidate perfect reference sampling window to provide a second cross-correlation sum; and wherein the detection module configured to detect a second peak value in the second cross-correlation sum and to determine a greatest value of first and second peak values.

* * * * *